United States Patent
Barnes

(10) Patent No.: US 9,747,663 B2
(45) Date of Patent: Aug. 29, 2017

(54) METHOD AND APPARATUS FOR PROVIDING MAPPING OF GEO LOCATIONS ON SCHEMATIC MAPS

(71) Applicant: HERE Global B.V., Veldhoven (NL)

(72) Inventor: Craig Barnes, Forest Park, IL (US)

(73) Assignee: HERE Global B.V., Veldhoven (NL)

( * ) Notice: Subject to any disclaimer, the term of this patent is extended or adjusted under 35 U.S.C. 154(b) by 291 days.

(21) Appl. No.: 14/579,119

(22) Filed: Dec. 22, 2014

(65) Prior Publication Data

US 2016/0180500 A1 Jun. 23, 2016

(51) Int. Cl.
| | | |
|---|---|---|
| G06T 17/00 | (2006.01) |
| G06T 3/00 | (2006.01) |
| G06T 11/20 | (2006.01) |
| G06T 3/40 | (2006.01) |
| G01C 21/32 | (2006.01) |
| G09B 29/00 | (2006.01) |

(52) U.S. Cl.
CPC ............ *G06T 3/0093* (2013.01); *G01C 21/32* (2013.01); *G06T 3/40* (2013.01); *G06T 11/203* (2013.01); *G09B 29/004* (2013.01); *G06T 2210/44* (2013.01)

(58) Field of Classification Search
None
See application file for complete search history.

(56) References Cited

U.S. PATENT DOCUMENTS

| | | | | |
|---|---|---|---|---|
| 5,664,071 A | * | 9/1997 | Nagashima | G06T 17/20 345/423 |
| 5,894,308 A | * | 4/1999 | Isaacs | G06T 17/20 345/420 |
| 2007/0112507 A1 | * | 5/2007 | Bargeron | G09B 29/106 701/425 |
| 2007/0176932 A1 | | 8/2007 | Salmre | |

(Continued)

FOREIGN PATENT DOCUMENTS

| | | |
|---|---|---|
| EP | 1876576 A1 | 1/2008 |
| NL | 2007013 C | 1/2013 |

OTHER PUBLICATIONS

Joachim Bottger et al., "Map Warping for the Annotation of Metro Maps", Oct. 2008, IEEE, vol. 28 Issue: 5.*

(Continued)

*Primary Examiner* — David H Chu
(74) *Attorney, Agent, or Firm* — Ditthavong & Steiner, P.C.

(57) ABSTRACT

An approach is provided for providing instantaneous and efficient mapping of geographic locations on to a schematic map. A map generation platform designates one or more reference locations for creating at least one schematic map associated with at least one schematic coordinate system. The map generation platform also creates at least one triangular mesh based, at least in part, on one or more geographic coordinates of the one or more reference locations, wherein the one or more geographic coordinates of the one or more reference locations represent one or more (Continued)

vertices of the triangular mesh. Further, the one or more geographic coordinates of one or more non-reference locations are mapped to the at least one triangular mesh, and then morphed for placing them on the at least one schematic map.

20 Claims, 14 Drawing Sheets

(56) References Cited

U.S. PATENT DOCUMENTS

| | | | |
|---|---|---|---|
| 2008/0195428 A1* | 8/2008 | O'Sullivan | G06Q 10/00 705/6 |
| 2011/0141115 A1* | 6/2011 | Brandes | G09B 29/007 345/428 |
| 2011/0196610 A1* | 8/2011 | Waldman | G01C 21/3644 701/533 |
| 2012/0116675 A1 | 5/2012 | Iles | |
| 2016/0155250 A1* | 6/2016 | Chen | G06T 11/206 345/440 |

OTHER PUBLICATIONS

Silvania Avelar et al. "Generating Topologically Correct Schematic Maps", 2000, In Proc. 9th Int. Symp. on Spatial Data Handling.*
European Office Action for related European Patent Application No. 151955762-1557 dated Aug. 22, 2016, 15 Pages.
Pio Claudio et al., "Metro Transit-Centric Visualization for City Tour Planning", posted online on Jul. 12, 2014, retrieved on Mar. 23, 2015, from http://onlinelibrary.wiley.com/doi/10.1111/cgf.12383/pdf, pp. 1-10.
Joachim Böttger et al., "Map Warping for the Annotation of Metro Maps", date of publication Sep. 2008, retrieved on Mar. 23, 2015, from http://citeseerx.ist.psu.edu/viewdoc/download?doi=10.1.1.228.2984&rep=rep1&type=pdf, pp. 1-8.

* cited by examiner

100

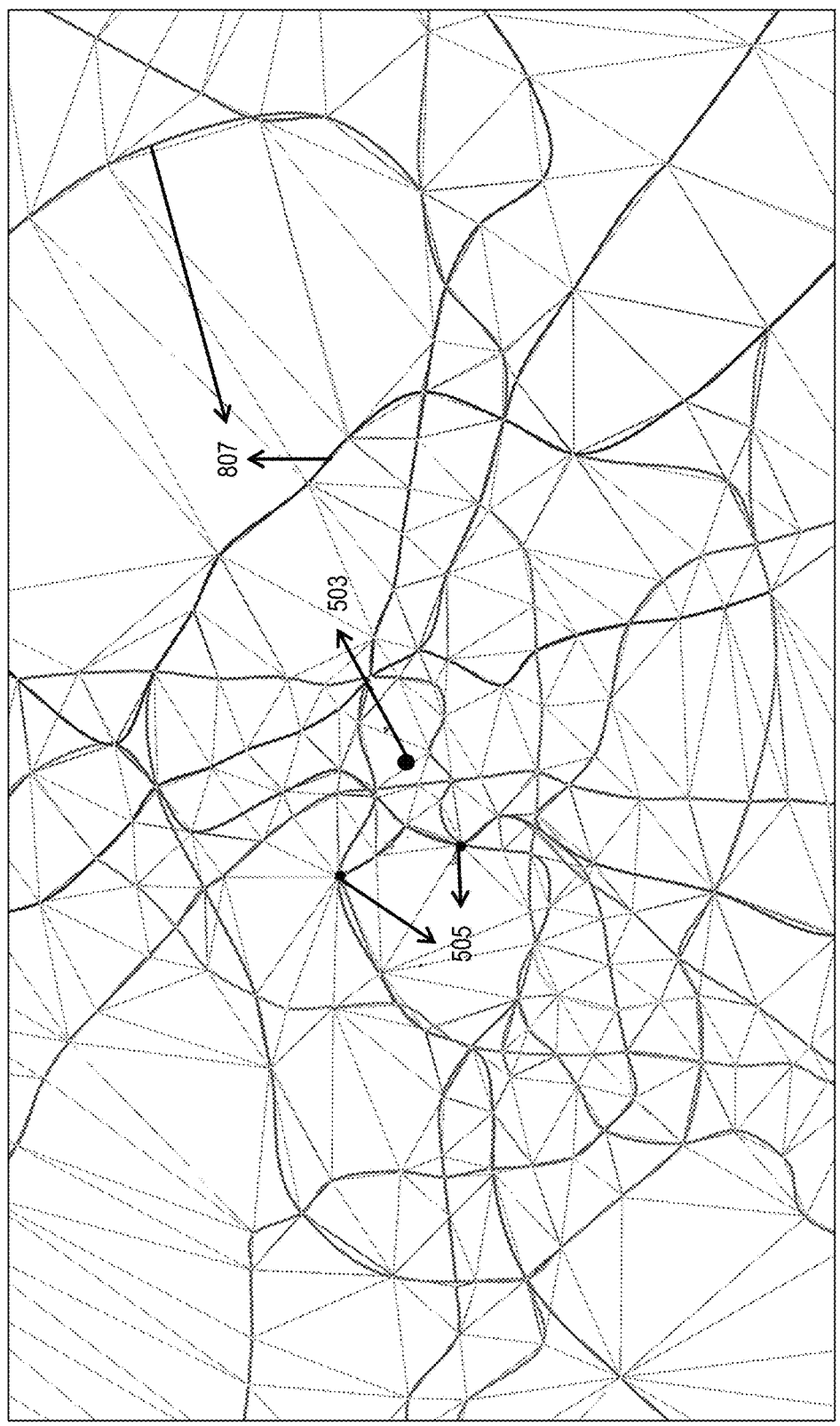

502

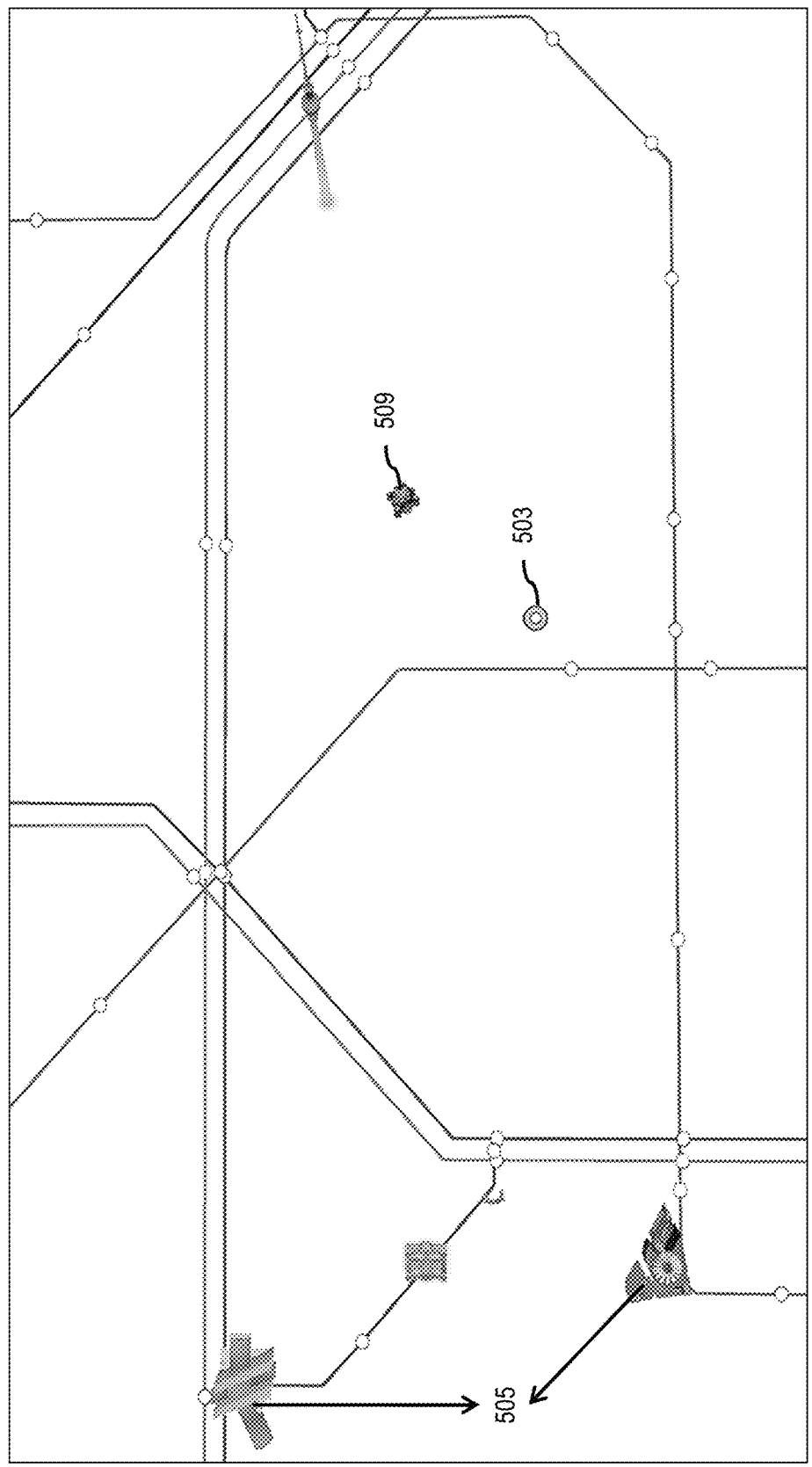

METHOD AND APPARATUS FOR PROVIDING MAPPING OF GEO LOCATIONS ON SCHEMATIC MAPS

BACKGROUND

Typically, schematic maps provide relevant information for a given situation (e.g., transit maps with various stations) in order to provide a simple representation that is sufficient to aid a user. However, with the advent of digital technology there has been an increasing interest in mapping geographic locations on a schematic map. Nevertheless, the difficulties encountered while correctly mapping geographic locations on a schematic map makes the process tedious and time-consuming. Accordingly, service providers and device manufacturers face significant technical challenges in providing a swift mapping of geographic locations on to a schematic map.

SOME EXAMPLE EMBODIMENTS

Therefore, there is a need for an approach for providing instantaneous and efficient mapping of geographic locations on to a schematic map.

According to one embodiment, a method comprises causing, at least in part, a designation of one or more reference locations for creating at least one schematic map from at least one geographic map using at least one schematic coordinate system. The method also comprises causing, at least in part, a creation of at least one triangular mesh based, at least in part, on one or more geographic coordinates of the one or more reference locations, wherein the one or more geographic coordinates of the one or more reference locations represent one or more vertices of the triangular mesh. The method further comprises causing, at least in part, a mapping of the one or more geographic coordinates of one or more non-reference locations to the at least one triangular mesh. The method also comprises causing, at least in part, a morphing of the one or more geographic coordinates of the one or more non-reference locations to the at least one schematic coordinate system for placing the one or more non-reference locations on the at least one schematic map.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a designation of one or more reference locations for creating at least one schematic map from at least one geographic map using at least one schematic coordinate system. The apparatus is also caused to cause, at least in part, a creation of at least one triangular mesh based, at least in part, on one or more geographic coordinates of the one or more reference locations, wherein the one or more geographic coordinates of the one or more reference locations represent one or more vertices of the triangular mesh. The apparatus is further caused to cause, at least in part, a mapping of the one or more geographic coordinates of one or more non-reference locations to the at least one triangular mesh. The apparatus is also caused to cause, at least in part, a morphing of the one or more geographic coordinates of the one or more non-reference locations to the at least one schematic coordinate system for placing the one or more non-reference locations on the at least one schematic map.

According to another embodiment, a computer-readable storage medium carries one or more sequences of one or more instructions which, when executed by one or more processors, cause, at least in part, an apparatus to cause, at least in part, a designation of one or more reference locations for creating at least one schematic map from at least one geographic map using at least one schematic coordinate system. The apparatus is also caused to cause, at least in part, a creation of at least one triangular mesh based, at least in part, on one or more geographic coordinates of the one or more reference locations, wherein the one or more geographic coordinates of the one or more reference locations represent one or more vertices of the triangular mesh. The apparatus is further caused to cause, at least in part, a mapping of the one or more geographic coordinates of one or more non-reference locations to the at least one triangular mesh. The apparatus is also caused to cause, at least in part, a morphing of the one or more geographic coordinates of the one or more non-reference locations to the at least one schematic coordinate system for placing the one or more non-reference locations on the at least one schematic map.

According to another embodiment, an apparatus comprises means for causing, at least in part, a designation of one or more reference locations for creating at least one schematic map from at least one geographic map using at least one schematic coordinate system. The apparatus also comprises means for causing, at least in part, a creation of at least one triangular mesh based, at least in part, on one or more geographic coordinates of the one or more reference locations, wherein the one or more geographic coordinates of the one or more reference locations represent one or more vertices of the triangular mesh. The apparatus further comprises means for causing, at least in part, a mapping of the one or more geographic coordinates of one or more non-reference locations to the at least one triangular mesh. The apparatus also comprises means for causing, at least in part, a morphing of the one or more geographic coordinates of the one or more non-reference locations to the at least one schematic coordinate system for placing the one or more non-reference locations on the at least one schematic map.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8A is a graphical representation of a mesh for a geographic layout, according to one example embodiment;

FIG. 8C is a graph diagram that represents a scenario wherein one or more landmarks and a users' current position are morphed to a schematic locations using the mesh, according to one example embodiment;

DESCRIPTION OF SOME EMBODIMENTS

Examples of a method, apparatus, and computer program for providing location based schematic maps are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to a mobile phone, it is contemplated that the exemplary methods and systems described herein may be used in connection with any other location based service or application that relies on such data. This may include, for example, beacon or tracking systems, navigation and mapping systems, and any other like systems.

Figure 1A:
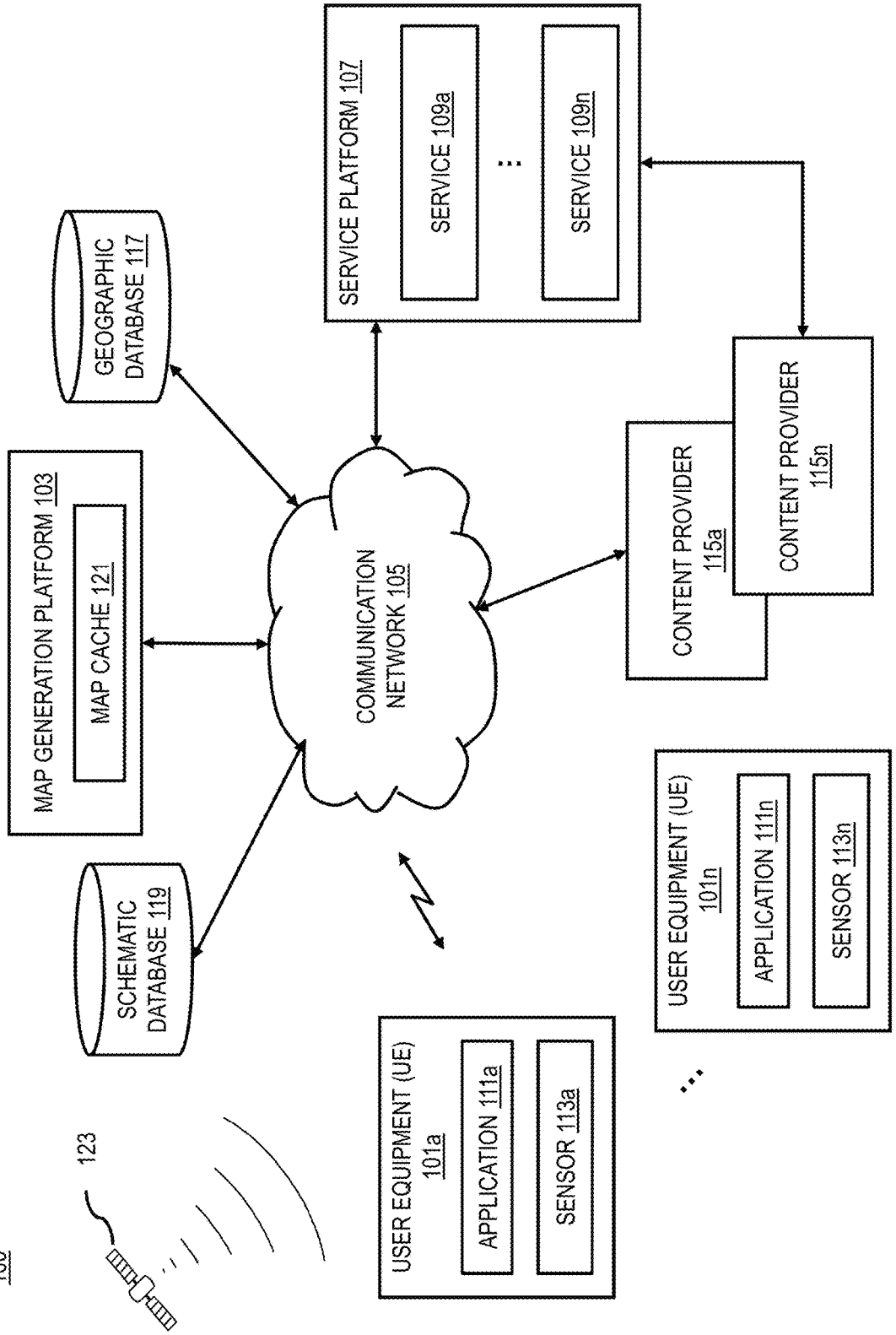
FIG. 1A is a diagram of a system for providing location based schematic maps, according to one embodiment.

FIG. 1A is a diagram of a system for providing location based schematic map, according to one embodiment. For the purpose of illustration herein, the schematic map include transit map of a city, and location includes the position of a user or a Point-Of-Interest (POI). It is noted that the position may be defined by schematic coordinates on a schematic map, and geographic coordinates on a geographical map. For example, the geographic coordinates may refer to latitude and longitude of the position on the geographical map. Further, the schematic coordinates for the same position may refer to converted geographic coordinates, on the schematic map.

As discussed previously, a schematic map may be converted to a corresponding geographical map and vice versa to depict a particular position with respect to other points or positions. For example, two train stations on a curved line in geographical map may be depicted on a straight line in a transit schematic map. Converting the real-world or geographic coordinates to the corresponding schematic coordinates is generally achieved by morphing the geographic coordinates. By way of example, the geographic coordinates of a train station may be morphed or converted to the schematic coordinates so that a user can easily see the geographic positions and the equivalent schematic position for the stations and the line connecting them. Typically, morphing of geographic coordinates of known reference locations (e.g., a train station, a train line, a bus stop, etc.) is less computationally extensive than that of non-reference locations (e.g., a POI, a user position, or any other point that is not available in a schematic map etc.) to generate corresponding schematic coordinates. Currently, the geographic coordinates are morphed to schematic coordinates by using, for example, linear interpolation or least squares computations. However, such computations are complex and time intensive. Resultantly, fast and efficient computations are unable to be achieved. By way of example, a mobile phone may be unable to perform the morphing in real-time by using the current techniques.

To address this issue, system 100 of FIG. 1A provides schematic map for non-reference locations and reference locations. As noted previously, the non-reference locations may relate to the locations that are not currently available on a schematic map (e.g., a POI, a user position, or any other point that is not available in a schematic map etc.). Further, the reference locations may relate to the locations that are currently available on a schematic map (e.g., a train station, a train line, a bus stop, etc.). In one embodiment, the locations on the schematic map are presented by using schematic coordinate system, which may be a predefined or a customized coordinate system for a specific application (e.g., train routes, bus routes, street maps etc.). In addition, the system 100 enables morphing of geographic coordinates of reference locations and non-reference locations to schematic coordinate system.

In one embodiment, a map generation platform 103 interfaces with one or more user equipment (UE) 101*a*-101*n* (also collectively referred to as UE 101) configured with one or more mapping applications 111*a*-111*n* (also collectively referred to as applications 111). The UE 101 may correspond to a mobile device associated with a driver, an onboard navigation system of a vehicle, or the like. The mapping applications 111 of the UE 101 acquire location information, navigation information, mapping information, POI information or the like regarding a current location of a user. By way of example, the mapping applications 111 at the UE 101 may act as a client for the map generation platform 103 and may perform one or more functions associated with the functions of the map generation platform 103 by interacting with the map generation platform 103 over the communication network 105.

In one embodiment, the mapping applications 111 may interact with various sensors 113*a*-113*n* (also collectively referred to as sensors 113) for receiving and analyzing data regarding the user, the vehicle, other vehicles, conditions regarding the driving environment, etc. By way of example, sensors 113 (e.g., of a mobile device or embedded within the vehicle) may be used as GPS receivers for interacting with one or more satellites 129 for determining speed, position and location data associated with the user. Still further, the sensors 113 may detect local or transient network and/or wireless signals, such as those transmitted by nearby devices of the user or during navigation of a vehicle along the travel path. This may include, for example, network routers configured within a premise (e.g., home or business), another UE 101 or vehicle or a communicable traffic system (e.g., traffic lights, traffic cameras, traffic signals, digital signage). It is further noted, in certain implementations, that the sensors 113 may correspond to, or operate in connection with, the sensors 113 of other vehicle for enabling data exchange and interaction. This exchange may be facilitated by way of any known or still developing range based or wireless communication protocols.

As will be discussed further, the map generation platform 103 enables the UE 101 to generate schematic maps based, at least in part, on the geographic coordinates of the reference locations and the non-reference locations. In one embodiment, the map generation platform 103 enables designation of one or more reference locations for creating a schematic map. In one embodiment, the schematic map is associated with the schematic coordinate system. Further, the reference locations are also associated with geographic coordinates. For example, the reference location may be a train station having geographic coordinates as the global latitude and longitude information. It is noted that geographic coordinates may be unique for every location around the globe, and may be determined from a geographic database 117 of system 100. In one embodiment, the map generation platform 103 causes normalization of the schematic coordinates of the locations. The normalization may relate to determining and designating custom and unique coordinates to the locations. For example, latitude and longitude information of the coordinates may be normalized to a scale between 0 and 1. By way of example, a latitude and longitude value [40°06'37.7"N, -88°14'02.8"W] of a location may be normalized to [0.005, 0.01].

In one embodiment, the map generation platform 103 enables generation of a triangular mesh based on the geographic coordinates of the reference locations. Per this approach, each of the reference locations may represent one or more vertices of the triangular mesh. By way of example, the triangular mesh may be generated based on a known algorithm such as Delaunay triangulation. It is noted that the triangles of the triangular mesh can be refined based on parameters or criteria established by the map generation platform 103, a provider of the application 111 or location-based service, or the like. For example, in a case where the triangles of the triangular mesh are either too large or too thin, then additional reference locations may be introduced to generate a more regular triangular mesh. In one embodiment, the map generation platform 103 normalizes the triangular mesh. Per this approach, the coordinates of the vertices of the triangles in the triangular mesh are normalized to a scale between 0 and 1.

In one embodiment, the map generation platform 103 enables mapping of the geographic coordinates of the non-reference locations on the triangular mesh. Per this approach, the triangle in the triangular mesh is determined that contains the non-reference locations. Further, the geographic coordinates of the non-reference locations are normalized between a scale of 0 and 1. In one embodiment, the mapping is achieved based on the normalized coordinates of the non-reference locations, the triangular mesh, the geographic coordinates, or a combination thereof.

In one embodiment, barycentric coordinates for the non-reference locations are determined based on the triangles that contain the non-reference locations. Generally, as per geometry, the barycentric coordinates of a location within a triangle relate to coordinates of a centroid or a center of mass of that triangle. Further, the mapping of the geographic coordinates of the non-reference locations to the triangular mesh is based on the barycentric coordinates.

In one embodiment, the map generation platform 103 enables morphing of the geographic coordinates of the non-reference locations to the schematic coordinate system for placing the non-reference locations on the schematic map using the schematic coordinate system. As noted previously, the geographic coordinates may be normalized to enable the morphing of the non-reference locations to the triangular mesh. Further, the morphing may be based on the barycentric coordinates of the non-reference locations. In one embodiment, the schematic map may be stored in the schematic database 119. Further, the schematic database 119 includes schematic maps for train, bus, car, pedestrian route maps, POI maps etc. As noted previously, the schematic maps may be based on schematic coordinate system. Further, the schematic map may include other data or information that is required for representation of this data (e.g., connecting lines, color of lines, graphic or visual components to represent locations, etc.). In one embodiment, the schematic maps may be based on normalized schematic coordinates. The map generation platform 103 may communicate with the schematic database 119 over the communication network 105.

In one embodiment, the map generation platform 103 enables caching of the barycentric coordinates and the geographic coordinates of the non-reference locations. The caching may be performed on a map cache 121. Further, the mapping and the morphing of the geographic coordinates of the non-reference locations may be based on the caching of the barycentric coordinates. In one embodiment, the normalized coordinates of the non-reference locations may be used for the mapping and the morphing to the schematic coordinate system. By way of example, the map cache 121 may be a memory location associated with the map generation platform 103 for fast storage and retrieval of information. For example, the memory may include a Random Access Memory (RAM), a Solid State Drive (SSD) etc. Thus, the map generation platform 103 may quickly morph or convert geographic coordinates of non-reference locations to generate schematic map.

In one embodiment, the map generation platform 103 enables scaling of the reference locations, the non-reference locations, or a combination thereof, based on the morphing of the one or more geographic coordinates of the one or more non-reference locations to the at least one schematic coordinate system. By way of example, the reference locations such as a building may be scaled or zoomed for a better view of the schematic map.

While not shown expressly in FIG. 1, the service platform 107 and content providers 115 may also interact with the geographic database 117 and/or a schematic database 119 for retrieving content, maps, waypoint data, point of interest data and other information related to or representative of a user position, a travel segment, its surrounding environment, etc.

In one embodiment, the map generation platform 103 may upload the generated schematic maps to the service platform 107 or the content providers 115 on a periodic basis, i.e., in accordance with a service arrangement. Per this arrangement, the content providers 115 and service providers establish a profile (register) for accessing the map generation platform 103 as a hosted solution or cloud based service. Similarly, the generated schematic maps may be uploaded to the schematic database 119.

Alternatively, the map generation platform 103 may operate in direct connection with a respective service 109, content provider 115 or the geographic database 117 for fulfilling a map request initiated by the application 111. For example, in the case where the UE 101 is a navigation system that submits a routing request, the map generation platform 103 retrieves the geographic coordinates and current schematic maps and/or content that meets the request criteria. It then generates the schematic map for the geographic coordinates accordingly. As such, textual and/or visual descriptors regarding the locations may be specified visibly on the schematic map and/or presented audibly along with turn-by-turn navigation instructions (e.g., "Expect to make a hard right at Exit 37/Leo Road.").

It is noted that the visual descriptors, which may include text, icons, or other graphics primitives, are only rendered to the display of the navigation system as necessary. For instance, when the exit ramp being approached by the vehicle is unrelated to the fulfillment of the navigation instructions or not related to reaching the final destination point, the visual elements need not be presented.

By way of example, the map generation platform 103 may be implemented as a cloud based service, hosted platform or the like for exchanging as well as receiving information from the services 109, providers 115 or applications 111. Alternatively, the map generation platform 103 may be directly integrated for processing data generated and/or provided by the services 109, providers 115 or applications 111. Per this integration or interface, the map generation platform 103 may translate location based information, navigation related content or the like as generated and exchanged during a navigation session into useful data for representing on the schematic map.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the UE 101 may be a vehicle (e.g., cars), a mobile device (e.g., phone), and/or a combination of the two.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the map generation platform 103, the service platform 107, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
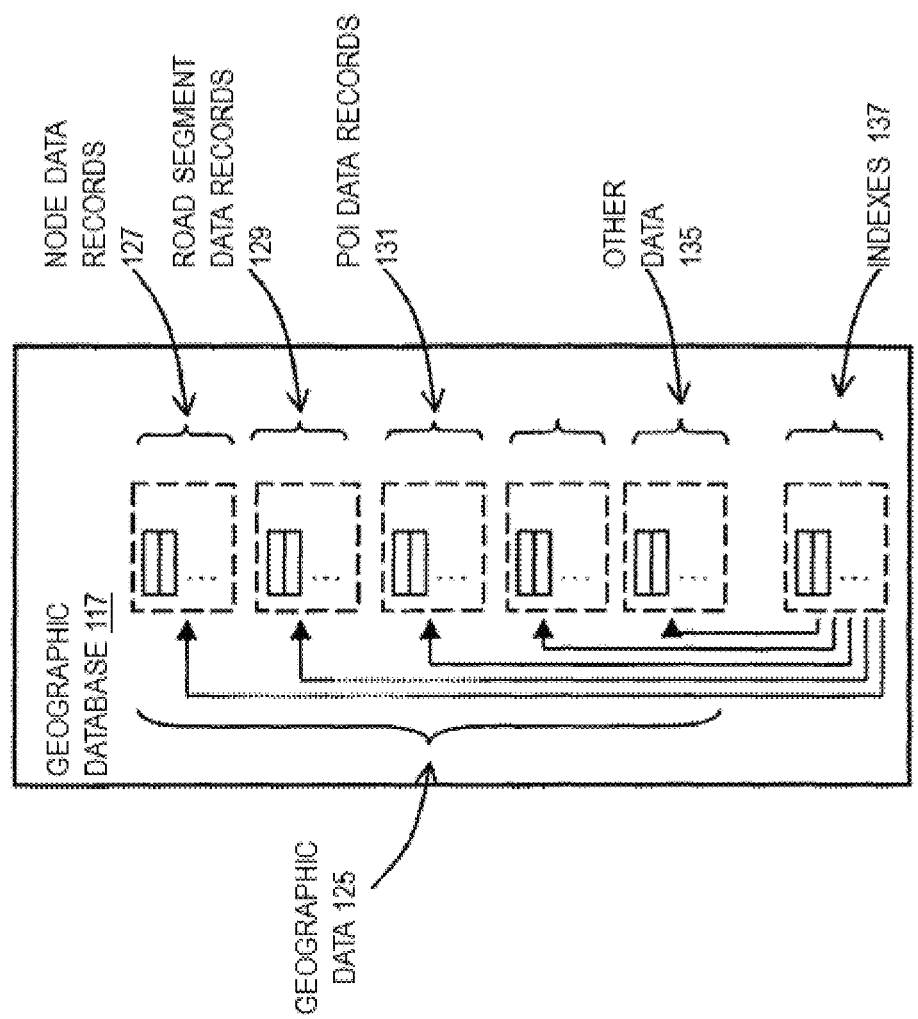
FIG. 1B is a diagram of a geographic database, according to one embodiment.

FIG. 1B is a diagram of a geographic database, according to one embodiment. In one embodiment, geographic data 131 regarding various locations (i.e., reference locations and/or non-reference locations), or a travel path may be stored, associated with, and/or linked to map generation platform 103 by way of the geographic database 117. The geographic or map database 117 includes geographic data 125 used for (or configured to be compiled to be used for) location map or navigation-related services. For example, the geographic database 117 may include node data records 127, road segment or link data records 129, POI data records 131, other data records 135, and indexes 137 to the geographic data 125. More, fewer or different data records may be provided. In one embodiment, the other data records 135 include cartographic ("carto") data records, routing data, and maneuver data, etc.

In one embodiment, the road segment data records 129 are links or segments representing roads, streets, or paths. The node data records 127 are end points corresponding to the respective links or segments of the road segment data records 129. The road link data records 129 and the node data records 127 represent a road network, such as used by vehicles, cars, and/or other entities. Alternatively, the geographic database 117 contains travel path segment and node data records or other data that represent pedestrian paths, vehicular paths, train routes, or areas or locations in addition to or instead of the vehicle or user road record data.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 117 may include data about the POIs and their respective locations in the POI data records 131. The geographic database 117 may also include data about places, such as cities, towns, or other communities, and other geographic features, such as bodies of water, mountain ranges, etc. Such place or feature data may be part of the POI data 131, such as a data point used for displaying or representing a position of a city. In addition, the geographic database 117 may include data about location-based events and their respective locations in the event data records 129. By way of example, the location-based events include any type of event that is associated with a particular location including, for instance, traffic, accidents, construction, public gatherings, etc.

In one embodiment, the geographic database 117 may include trajectory data records 209 for determining trajectory paths through a transportation structure.

The geographic database 117 may be maintained by the content provider 115 (e.g., a map developer) or the provider of the services 109. By way of example, the content providers or service providers may employ different approaches for generating and/or storing the geographic data. This may include, for example, obtaining data from other sources, such as municipalities or respective geographic authorities. In addition, the providers may employ field personnel to travel by vehicle along roads throughout a geographic region in order to observe features and/or record information descriptive of a travel path, its surrounding environment, etc. Also, the providers may employ remote sensing, such as aerial or satellite photography.

The geographic database 117 may be a master geographic database stored in a format that facilitates updating, maintenance and development. For example, the master geographic database 117 or data in the master geographic database 117 may be generated according to an Oracle spatial format or other spatial format for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation system. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, the database 117 may be a master geographic database, but in alternate embodiments, the database may represent a compiled navigation database that may be used in or with UE 101 to provide navigation or map-related functions. For example, the database 117 may be used with the UE 101 to provide a vehicle with navigation features. In such a case, the database may be downloaded or stored on the UE 101, or the UE 101 may access the database 117 through a wireless or wired connection (such as via a server and/or network 105).

In one embodiment, the UE 101 may be an in-vehicle navigation system, a personal navigation device ("PND"), a portable navigation device, a cellular telephone, a mobile phone, a personal digital assistant ("PDA"), a watch, a camera, a computer, and/or other device that can perform navigation-related functions, such as digital routing and map display. In one embodiment, the UE 101 is a cellular telephone for executing the application 111 to present guidance information and map displays. It is contemplated, in future embodiments, that the cellular telephone may be interfaced with an on-board navigation system of an autonomous vehicle or physically connected to the vehicle for serving as map display and/or the navigation system.

Figure 2:
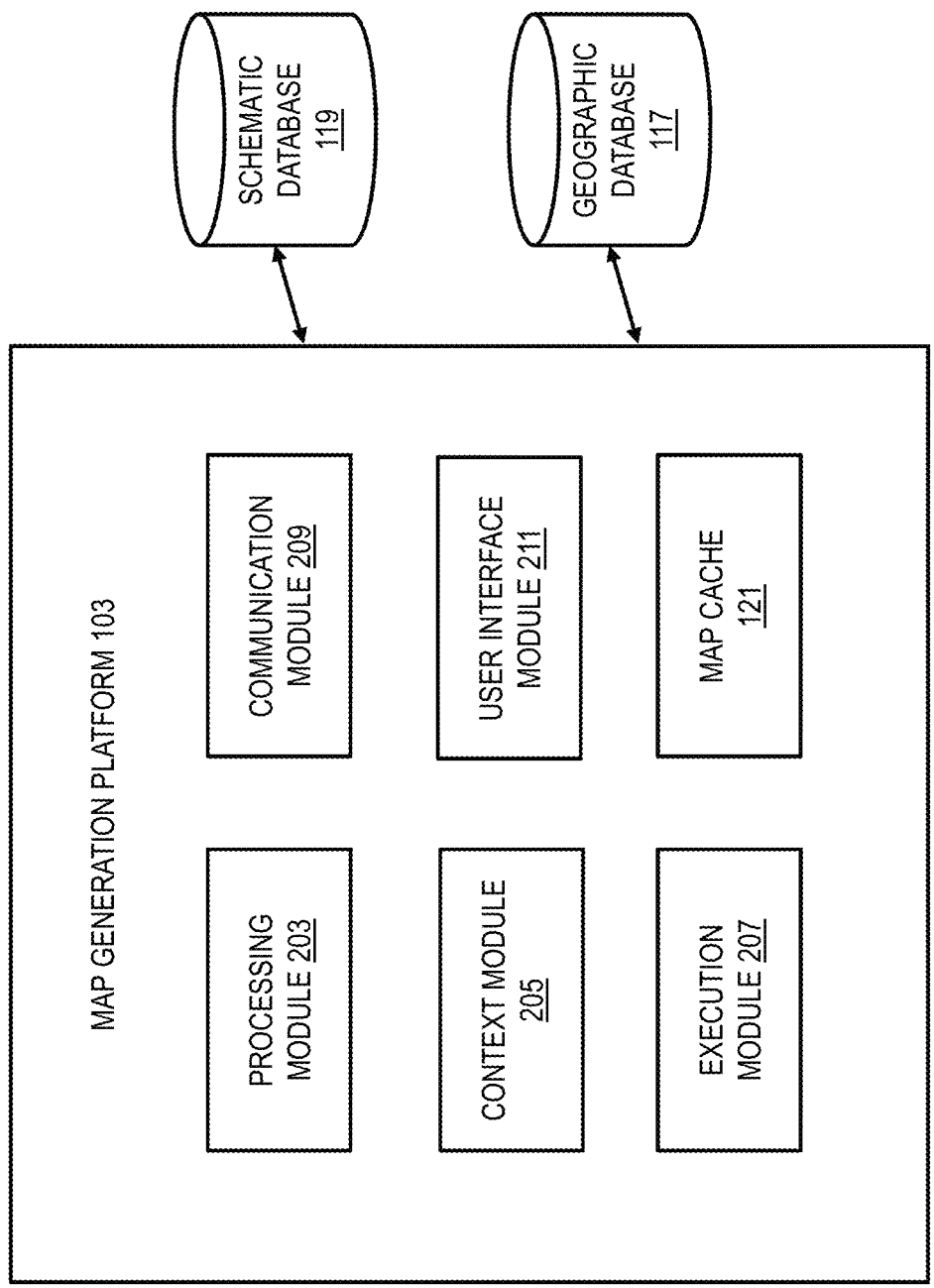
FIG. 2 is a diagram of the components of a map generation platform, according to one embodiment.

FIG. 2 is a diagram of the components of a map generation platform, according to one embodiment. As noted previously, the functionalities of the map generation platform 103 may be analogous. By way of example, the map generation platform 103 (referred herein after as the platform 103) includes one or more components for generating a schematic map. It is contemplated that the functions of these components may be combined in one or more components or performed by other components of equivalent functionality. In this embodiment, the platform 103 includes a processing module 203, a context module 205, an execution module 207, a communication module 209, a user interface module 211, and a map cache 121.

The processing module 203 operates in connection with the context module 205 to interpret map data associated with a user or one or more vehicles as they navigate a travel path. The context module 205 gathers the sensor information generated by the sensors of the UE 101 for specifying the location or position, etc., while the processing module 203 evaluates this information against various criteria. The criteria may include, for example, variance thresholds, discrepancy factors and other metrics that when fulfilled, generate the schematic based on the location. For example, the context module 205 gathers information regarding geographic coordinates of the reference locations and non-reference locations. As noted previously, the reference locations may relate to known locations (e.g., train stops, bus stops, transit lines etc.) on a schematic map, and the non-reference locations may relate to locations not currently available on the schematic map. In one embodiment, the context module 205 gathers the location information related to the reference locations and non-reference locations from the schematic database 119 and the geographic database 117. As noted previously, the location information in the schematic database 119 may be associated with schematic coordinate system.

The execution module 207 determines an instruction, an action and/or a decision point to be executed by the UE 101 or a vehicle equipped with UE 101, based on the determined maps and location information. By way of example, the execution module 207 generates the schematic map including the non-reference locations based on the determined maps and location information.

In one embodiment, the execution module 207 normalizes the schematic coordinates of the locations. For example, the latitude and longitude information of the coordinates may be normalized to a scale between 0 and 1. However, a person skilled in the art will appreciate that any other parameter to normalize the data may be applied (e.g., a scale between 0 and 2).

In one embodiment, the execution module 207 generates a triangular mesh based on the geographic coordinates of the reference locations. As noted previously, the triangular mesh includes multiple triangles with each of the reference locations representing one or more vertices of the triangles. By way of example, for a bus transit line, the bus stops may represent the vertices of a triangle in the triangular mesh. In one embodiment, the execution module 207 normalizes the triangular mesh. Per this approach, the coordinates of the vertices of the triangles in the triangular mesh are normalized to a scale between 0 and 1.

In one embodiment, the execution module 207 maps the geographic coordinates of the non-reference locations on the triangular mesh. As previously noted, a triangle in the triangular mesh is determined such that it contains the coordinates of the non-reference locations within its vertices. Further, the execution module 207 normalizes the geographic coordinates of the non-reference locations are between a scale of 0 and 1. In one embodiment, the mapping is achieved based on the normalized coordinates of the non-reference locations, the triangular mesh, the geographic coordinates, or a combination thereof.

In one embodiment, the execution module 207 determines the barycentric coordinates for the non-reference locations based on the triangles that contain the non-reference locations. In one embodiment, the mapping of the geographic coordinates of the non-reference locations to the triangular mesh is based on the barycentric coordinates.

In one embodiment, the execution module 207 morphs the geographic coordinates of the non-reference locations to the schematic coordinate system for placing the non-reference locations on the schematic map that is using the schematic coordinate system. As noted previously, the geographic coordinates may be normalized to enable the morphing of the non-reference locations to the triangular mesh. In one embodiment, the morphing may be caused based on the barycentric coordinates of the non-reference locations.

In one embodiment, the execution module 207 caches the barycentric coordinates and the geographic coordinates of the non-reference locations. The caching may be performed on a map cache 121. As noted previously, the mapping and the morphing of the geographic coordinates of the non-reference locations may be based on the caching of the barycentric coordinates. In one embodiment, the normalized coordinates of the non-reference locations may be used for the mapping and the morphing to the schematic coordinate system.

The execution module 207 may also operate in connection with the communication module 209 and the user interface module 211 to cause the transmission or rendering of an instruction respectively. By way of example, the execution module 207 may trigger the user interface module 211, which executes one or more application programming interface (API) executions of the platform 103 for generating and presenting the schematic map and associated locations etc. As another example, the execution module 207 may trigger the communication module 209 to transmit an instruction for initiating a generation and/or display of the schematic map on the vehicles navigation system (e.g., UE 101), in response to the approaching of the vehicle to a corresponding location, segment of the travel path, or a POI.

In one embodiment, the execution module 207 enables scaling of the reference locations, the non-reference locations, or a combination thereof, based on the morphing of the one or more geographic coordinates of the one or more non-reference locations to the at least one schematic coordinate system. By way of example, the reference locations such as a building may be scaled or zoomed for a better view of the schematic map. The scaled or zoomed view may be displayed on the UE 101 through the user interface module 211.

It is further noted that the user interface module 211 may operate in connection with the communication module 209 for facilitating the exchange of map information via the communication network 105 with respect to the services 109, content providers 115 and applications 111.

The above presented modules and components of the map generation platform 103 can be implemented in hardware, firmware, software, or a combination thereof. Though depicted as a separate entity in FIG. 1A, it is contemplated that the platform 103 may be implemented for direct operation by respective UEs 101. As such, the map generation platform 103 may generate direct signal inputs by way of the operating system of the UE 101 for interacting with the application 111. In another embodiment, one or more of the modules 203-211 may be implemented for operation by respective UEs as a platform 103, cloud based service, or combination thereof.

Figure 3:
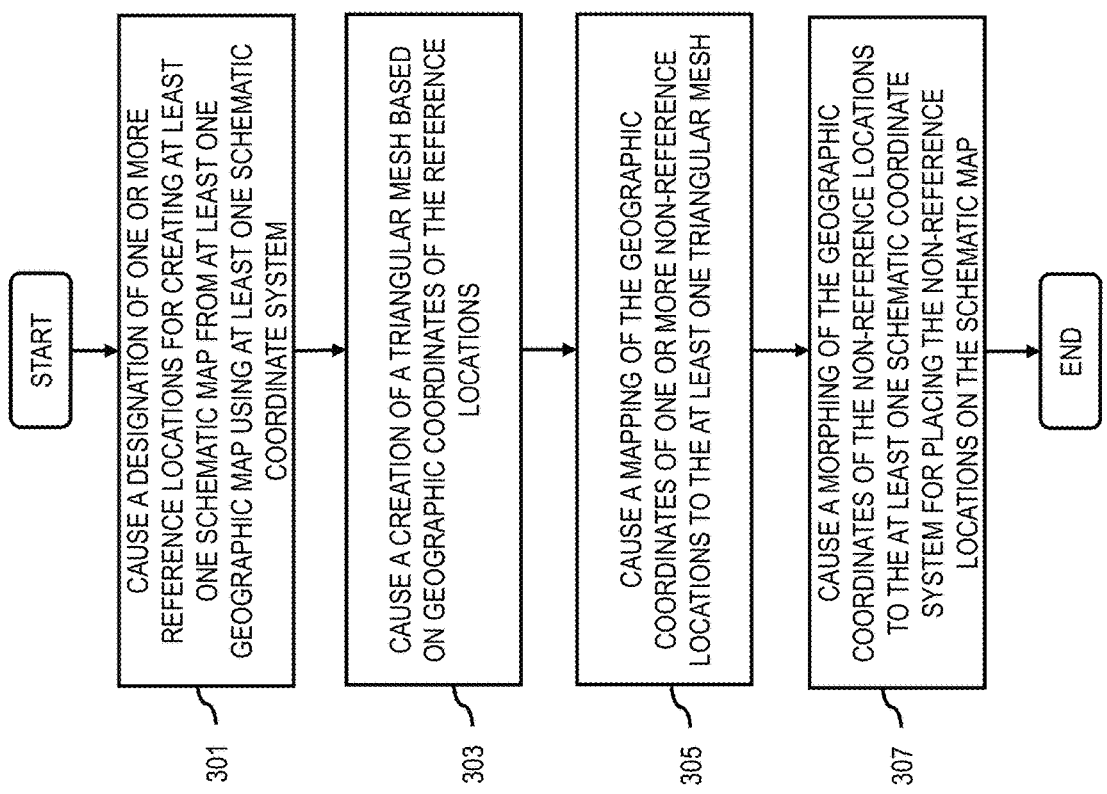
FIG. 3 is a flowchart of a process for mapping geographic coordinates of non-reference location to a triangular mesh for morphing to the schematic coordinate system, according to one embodiment.
Figure 10:
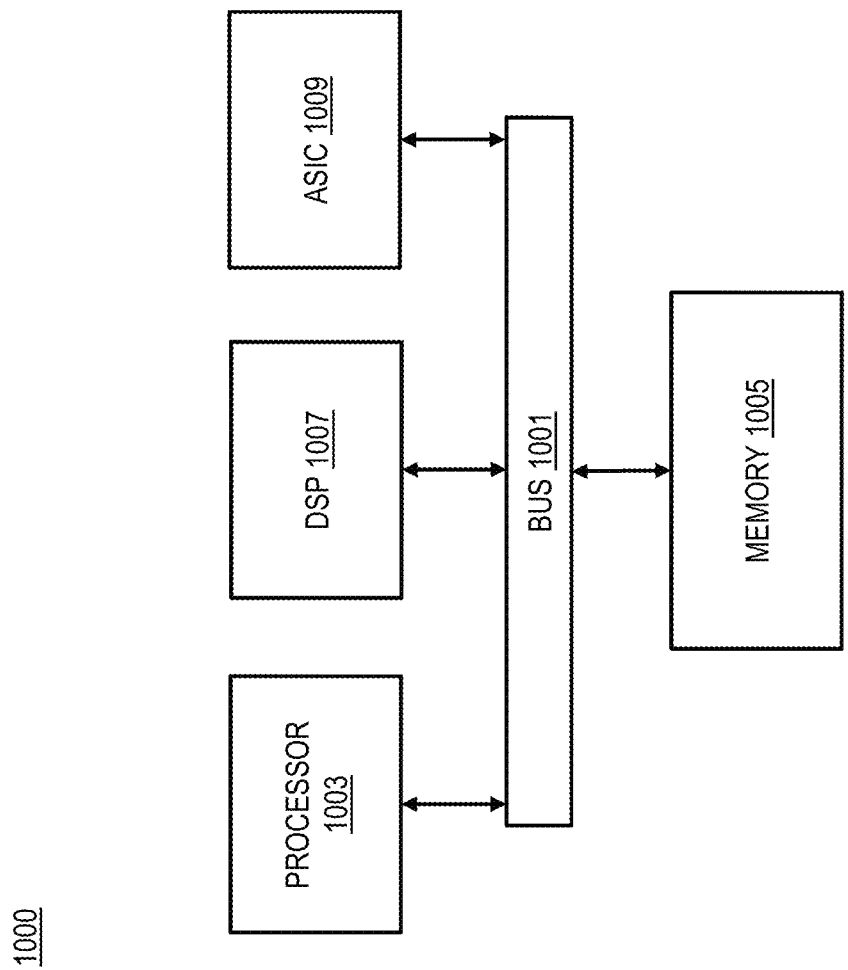
FIG. 10 is a diagram of a chip set that can be used to implement an embodiment of the invention.

FIG. 3 is a flowchart of a process for mapping geographic coordinates of non-reference location to a triangular mesh for morphing to the schematic coordinate system, according to one embodiment. In one embodiment, the map generation platform 103 performs the process 300 and is implemented in, for instance, a chip set including a processor and a memory as shown in FIG. 10.

In step 301, the map generation platform 103 designates one or more reference locations for creating at least one schematic map associated with at least one schematic coordinate system. In one embodiment, the at least one schematic map is a map of a transit system, and wherein one the one or more reference locations include, at least in part, one or more stops, one or more lines, or a combination thereof of the transit system.

In step 303, the map generation platform 103 creates at least one triangular mesh based, at least in part, on one or more geographic coordinates of the one or more reference locations. As noted previously, the one or more geographic coordinates of the one or more reference locations represent one or more vertices of the triangular mesh. In one embodiment, the at least one schematic map is a map of a transit system; wherein one the one or more reference locations include one or more stops, one or more lines, or a combination thereof of the transit system. In one embodiment, the geographic coordinates may be determined based on the latitude and longitude information of the location. In one embodiment, the map generation platform 103 causes a subdivision of the at least one triangular mesh to generate one or more refined vertices of the triangular mesh. As noted previously, in a case where the triangles of the triangular mesh are either too large or too thin, then additional reference locations may be introduced to generate a more regular or refined triangular mesh Per step 305, the map generation platform 103 enables mapping one or more geographic coordinates of one or more non-reference locations to the at least one triangular mesh. In one embodiment, the one or more non-reference locations include one or more points of interest, a user location, or a combination thereof. As noted previously, the mapping may include determination of the triangles containing the one or more non-reference locations.

In step 307, the map generation platform 103 morphs of the one or more geographic coordinates of the one or more non-reference locations to the at least one schematic coordinate system for placing the one or more non-reference locations on the at least one schematic map. As noted previously, the morphing may include conversion of the geographic coordinates of the non-reference locations to schematic coordinates of the schematic coordinate system. Resultantly, the non-reference locations are presented on the schematic map. By way of example, a user's current location may be displayed on a train transit map, so that the user can better estimate his location with respect to the train stop.

Further, by way of example, a current position of the user may be displayed on a UE 101 (e.g., a mobile phone, a navigation system, etc.).

Figure 4:
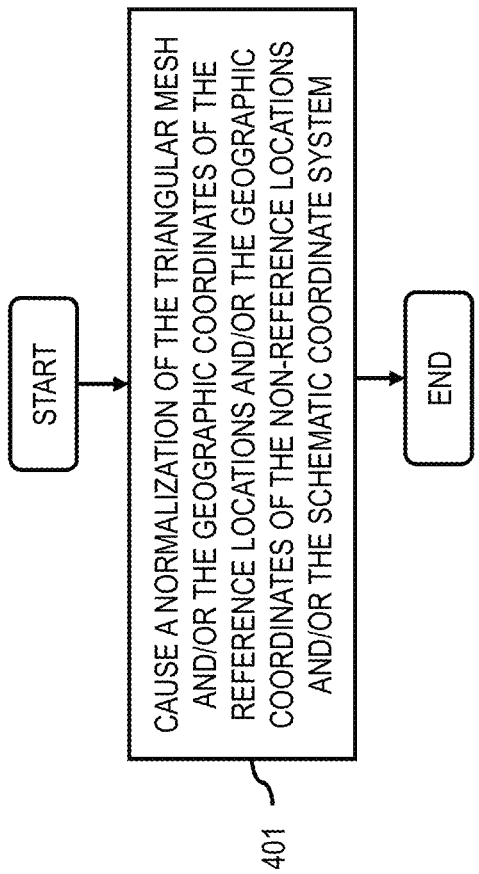
FIG. 4 is a flowchart of a process for normalization of the triangular mesh, geographic coordinates of the reference locations and/or non-reference locations, schematic coordinate system, or a combination thereof, according to one embodiment.

FIG. 4 is a flowchart of a process for normalization of the triangular mesh, geographic coordinates of the reference locations and/or non-reference locations, schematic coordinate system, or a combination thereof, according to one embodiment. In one embodiment, the map generation platform 103 performs the process 400 and is implemented in, for instance, a chip set including a processor and a memory as shown in FIG. 10.

In step 401, the map generation platform 103 normalizes the triangular mesh, the one or more geographic coordinates of the one or more reference locations, the one or more geographic coordinates of the non-reference locations, the at least one schematic coordinate system, or a combination thereof. In one embodiment, the normalization by the map generation platform 103 normalizes the latitude information and the longitude information to a scale between 0 and 1. Subsequently, the map generation platform 103 enables mapping, the morphing, or a combination thereof of the one or more geographic coordinates of the one or more non-reference locations is based, at least in part, on the normalization.

Figure 5:
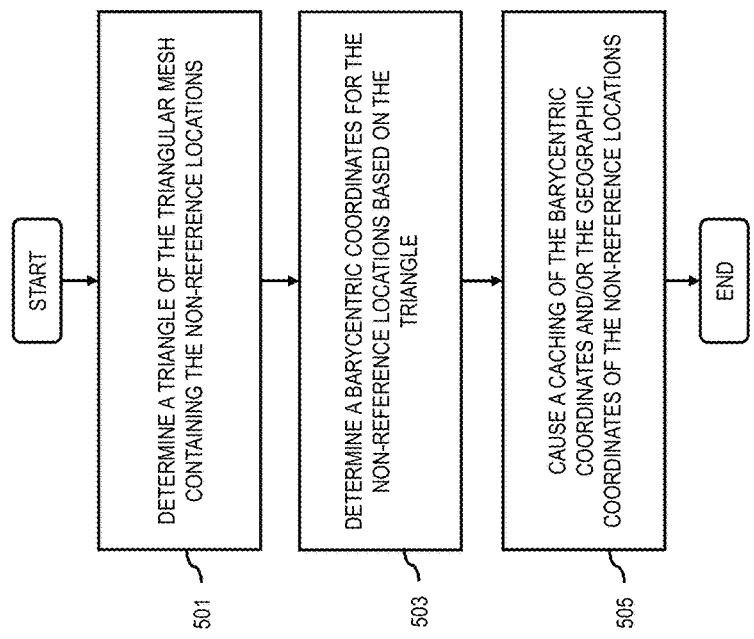
FIG. 5 is a flowchart of a process for caching of barycentric coordinates and/or geographic coordinates of non-reference locations based on a triangle of a triangular mesh, according to one embodiment.

FIG. 5 is a flowchart of a process for caching of barycentric coordinates and/or geographic coordinates of non-reference locations based on a triangle of a triangular mesh, according to one embodiment. In one embodiment, the map generation platform 103 performs the process 500 and is implemented in, for instance, a chip set including a processor and a memory as shown in FIG. 10.

In step 501, the map generation platform 103 determines at least one triangle of the at least one triangular mesh that contains the one or more non-reference locations. By way of example, the coordinates of the non-reference locations may be compared with the coordinates corresponding to the vertices of the triangles in the triangular mesh to identify such a triangle.

In step 503, the map generation platform 103 determines one or more barycentric coordinates for the one or more non-reference locations based, at least in part, on the at least one triangle. For example, as per geometry, the barycentric coordinates of a location within a triangle relate to coordinates of a centroid or a center of mass of that triangle. In one embodiment, the mapping of the one or more geographic coordinates of the one or more non-reference locations to the at least one triangular mesh is based, at least in part, on the one or more barycentric coordinates.

In step 505, the map generation platform 103 caches the one or more barycentric coordinates, the one or more geographic coordinates of the one or more non-reference locations, or a combination thereof. As noted previously, the caching may be performed in a map cache 121. Then, the map generation platform 103 morphs of the one or more geographic coordinates of the one or more non-reference locations to the at least one schematic coordinate system is based, at least in part, on the caching.

By way of example, the coordinates of a non-reference location may be determined on the schematic map by using an exemplary equation:

$$P_{morph} = ua + vb + wc \qquad \text{Equation (1)}$$

Wherein, 'u', 'v', and 'w' represent the vertices of the triangle on the triangular mesh, and 'a', 'b', and 'c' represents the barycentric coordinates of the non-reference location.

In one embodiment, the caching enables faster processing of the data. By way of example, the caching may enable low power devices such as mobile phones, navigation systems, or embedded devices, to process the data faster or in real-time. In one embodiment, the generated schematic map may be generated and presented on the UE 101 in real-time. For example, the presentation may be in the form of schematic transit maps on the graphical display of the UE 101.

Figure 6:
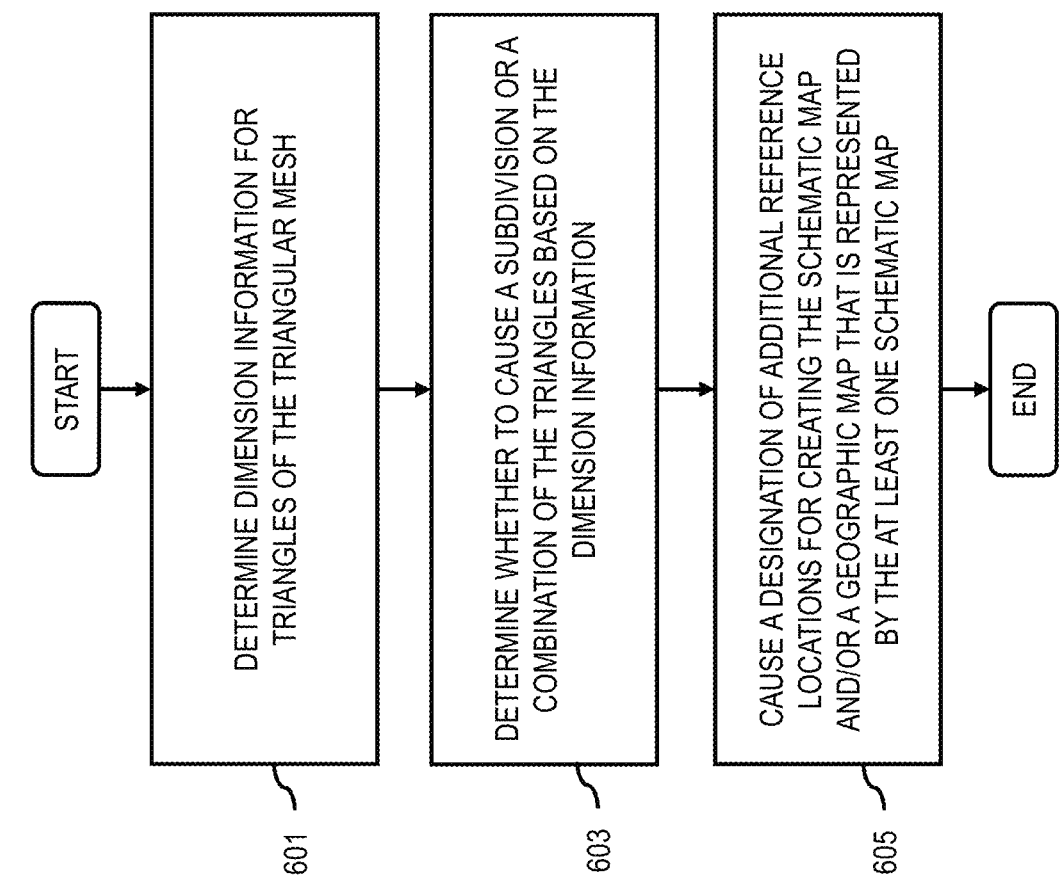
FIG. 6 is a flowchart of a process for determining subdivision or a combination of triangles, and designating additional reference locations, according to one embodiment.

FIG. 6 is a flowchart of a process for determining subdivision or a combination of triangles, and designating additional reference locations, according to one embodiment. In one embodiment, the map generation platform 103 performs the process 600 and is implemented in, for instance, a chip set including a processor and a memory as shown in FIG. 10.

In step 601, the map generation platform 103 determines dimension information for one or more triangles of the at least one triangular mesh.

In step 603, the map generation platform 103 determines whether to cause, at least in part, a subdivision or a combination of the one or more triangles based, at least in part, on the dimension information. In one scenario, the triangulation based on stop positions may have triangles that are either too large or too thin. This might result in less than optimal mappings between the two positions. As a result, the map generation platform 103 may subdivide each triangle by introducing additional locations in both the geographic and schematic maps to create more regular triangles.

In step 605, the map generation platform 103 causes, at least in part, a designation of one or more additional reference locations for creating the at least one schematic map, at least one geographic map that is represented by the at least one schematic map, or a combination thereof. In one embodiment, the subdivision or the combination of the one or more triangles is based, at least in part, on the one or more additional reference locations.

Figure 7:
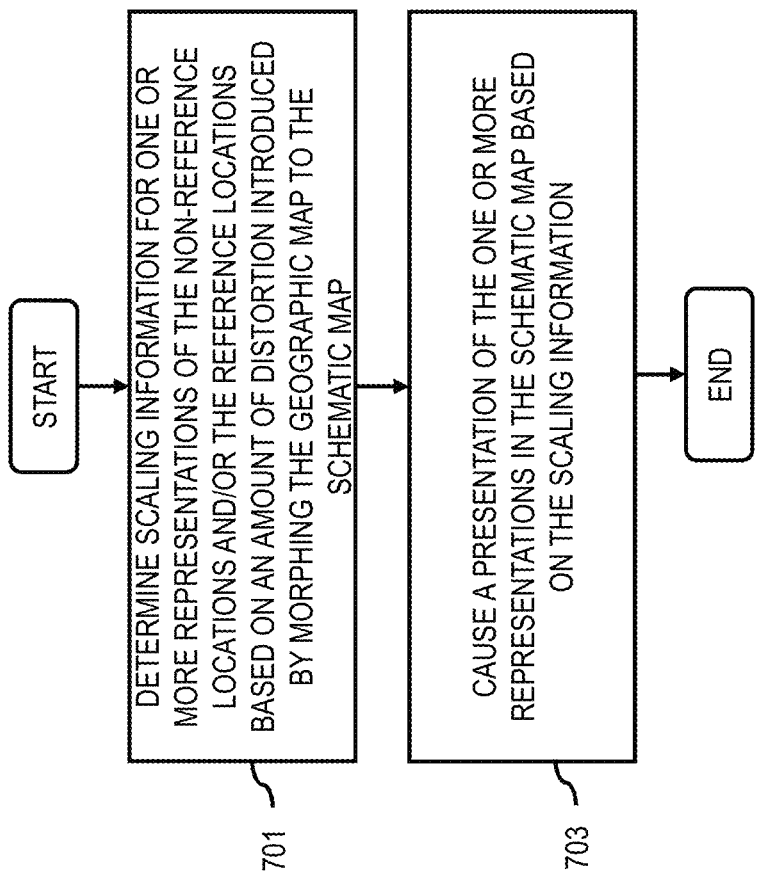
FIG. 7 is a flowchart of a process for causing a presentation of scaling information in a schematic map, according to one embodiment.

FIG. 7 is a flowchart of a process for causing a presentation of scaling information in a schematic map, according to one embodiment. In one embodiment, the map generation platform 103 performs the process 700 and is implemented in, for instance, a chip set including a processor and a memory as shown in FIG. 10.

In step 701, the map generation platform 103 determines scaling information for one or more representations of the one or more non-reference locations, the one or more reference locations, or a combination thereof based, at least in part, on an amount of distortion introduced by morphing the at least one geographic map to the at least one schematic map. In one scenario, the distortion of the mesh from geographic to real world can be used for controlling landmark scaling, for example, the expansion or contraction of the areas around landmarks may be computed using the mesh distortion (e.g., triangle area change) and fed into a landmark's scaling (size) parameter.

In step 703, the map generation platform 103 causes, at least in part, a presentation of the one or more representations in the at least one schematic map based, at least in part, on the scaling information.

FIG. 8A is a graphical representation of a mesh for a geographic layout, according to one example embodiment. In one scenario, FIG. 8A depicts a geographic layout or map 800 for various transit lines 807. As depicted, the geographic layout 800 further includes a non-reference location 803 (e.g., a user's current location), and various reference locations 805 (e.g., train stops on the transit lines 807). In one embodiment, the geographic map 800 further depicts a triangular mesh with various triangles. It is noted that reference locations are depicted as vertices of triangles in the triangular mesh. Further, the geographic coordinates of the reference locations and non-reference location may be used to generate the triangular mesh. Therefore, the vertices of the triangles may relate to the geographic coordinates of the reference locations. Further, the coordinates may be retrieved from the geographic database 117.

Figure 8B:
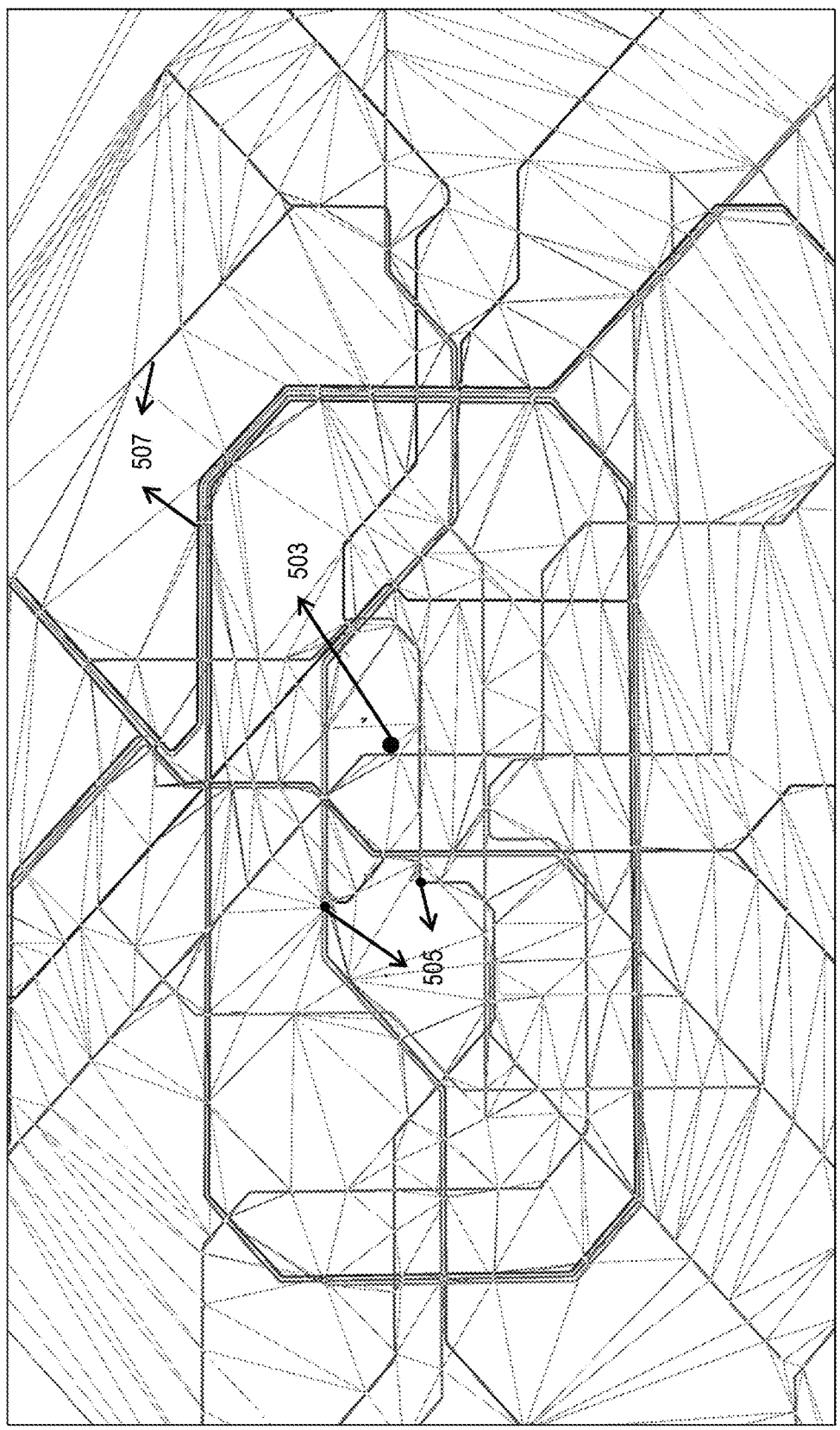
FIG. 8B is a graphical representation of a mesh morphed to schematic map, according to one example embodiment.

FIG. 8B is a graphical representation of a mesh morphed to schematic map, according to one example embodiment. In one scenario, FIG. 8B depicts a schematic layout or map 802 including the transit lines 807, non-reference location 803, and reference locations 805. As noted previously, the non-reference location 803 is placed on the schematic map 802 by mapping and morphing of the geographic coordinates of the non-reference location to the triangular mesh.

FIG. 8C is a graph diagram that represents a scenario wherein one or more landmarks and a users' current position are morphed to a schematic locations using the mesh, according to one example embodiment. In one scenario, FIG. 8C depicts a scaled or a zoomed-in schematic map 804 of the schematic map 802. In one embodiment, another non-reference location 809 is also visible on the schematic map 804. By way of example, the amount of scaling or zooming on the schematic map 804 may be controlled by a user of UE 101. Further, the schematic map 802 or schematic map 804 may be panned by the user for viewing information not displayed in a current view. In one embodiment, the locations or coordinates can be computed in real-time. By way of example, dynamic positions such as the user's current position and connecting buses or trains can be shown on the schematic map 802 during the morphing. In one embodiment, additional information such as contextual data associated with the reference locations and non-reference locations may be displayed on the schematic maps 802 and/or 804. For example, the contextual data includes the distance between the reference locations and non-reference locations, navigation path to various locations, address or coordinates of the locations, or audio, video, or graphic instruction to navigate to the desired locations etc.

The processes described herein for mapping the geographic coordinates of non-reference location to a triangular mesh for morphing to the schematic coordinate system may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
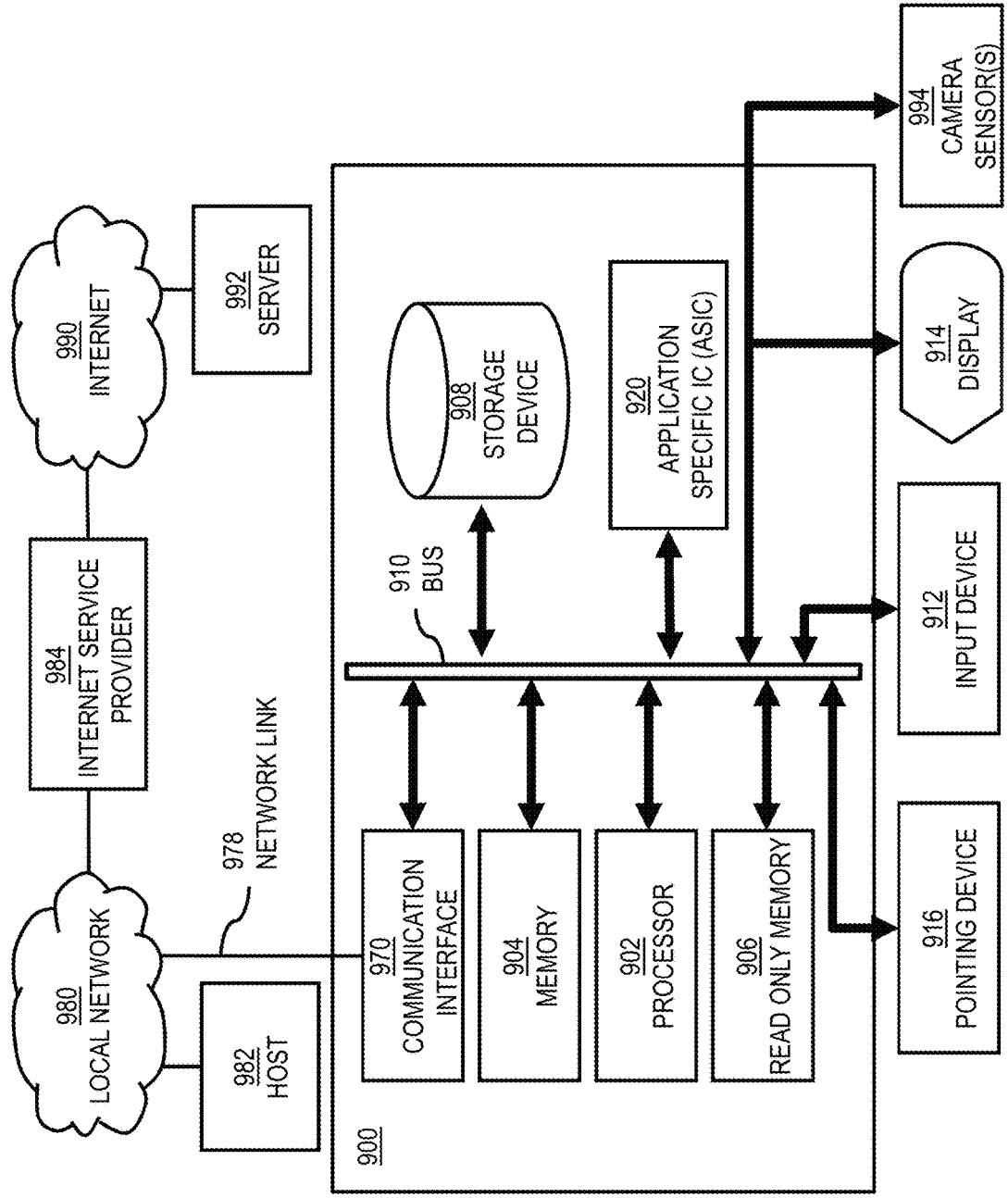
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to map the geographic coordinates of non-reference location to a triangular mesh for morphing to the schematic coordinate system as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of mapping the geographic coordinates of non-reference location to a triangular mesh for morphing to the schematic coordinate system.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to mapping the geographic coordinates of non-reference location to a triangular mesh for morphing to the schematic coordinate system. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for mapping the geographic coordinates of non-reference location to a triangular mesh for morphing to the schematic coordinate system. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for mapping the geographic coordinates of non-reference location to a triangular mesh for morphing to the schematic coordinate system, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet.

Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for mapping the geographic coordinates of non-reference location to a triangular mesh for morphing to the schematic coordinate system to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to map the geographic coordinates of non-reference location to a triangular mesh for morphing to the schematic coordinate system as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of mapping the geographic coordinates of non-reference location to a triangular mesh for morphing to the schematic coordinate system.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to map the geographic coordinates of non-reference location to a triangular mesh for morphing to the schematic coordinate system. The memory 1005 also stores the data associated with or generated by the execution of the inventive steps.

Figure 11:
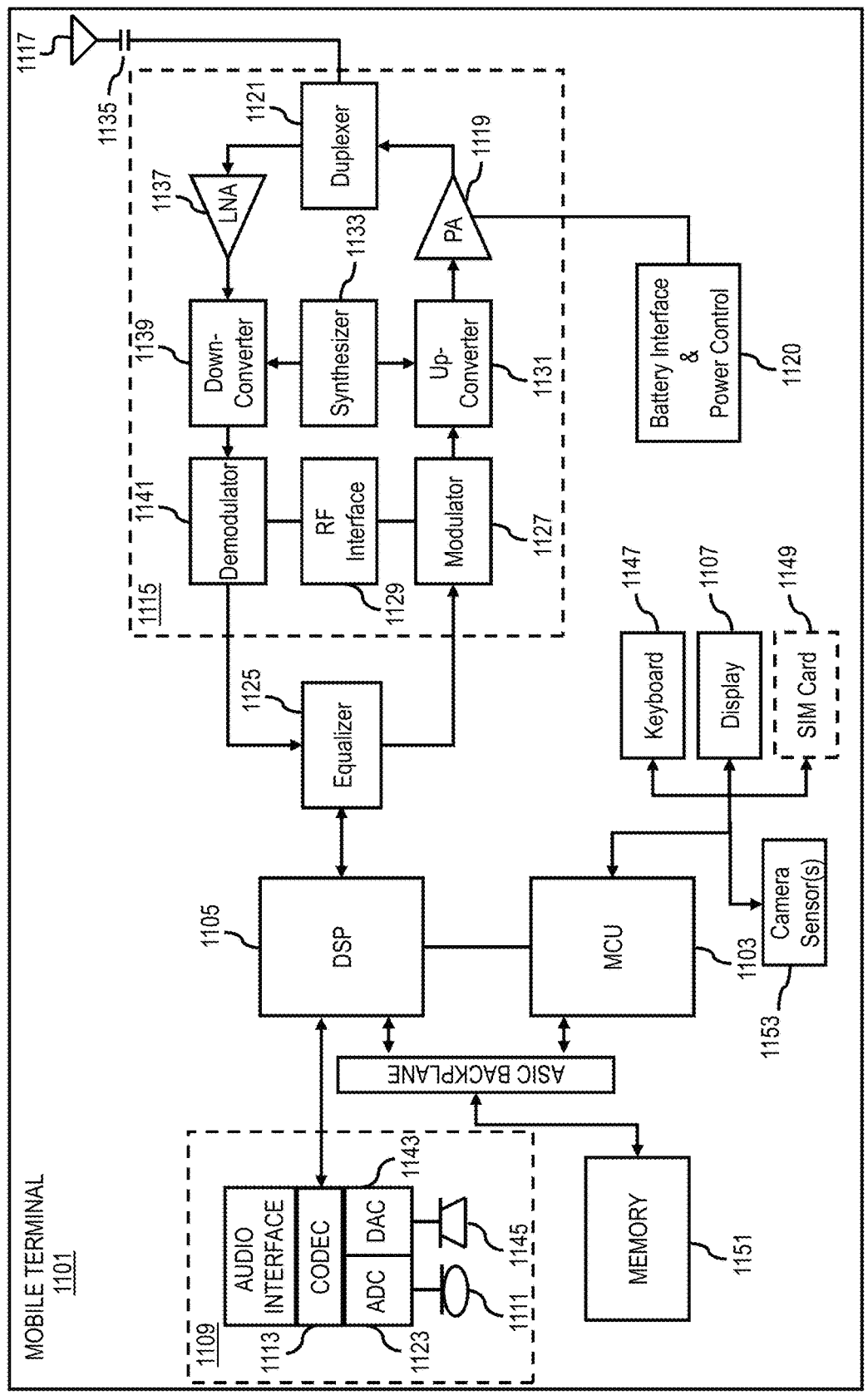
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1A, according to one embodiment. In some embodiments, mobile terminal 1101, or a portion thereof, constitutes a means for performing one or more steps of mapping the geographic coordinates of non-reference location to a triangular mesh for morphing to the schematic coordinate system. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of mapping the geographic coordinates of non-reference location to a triangular mesh for morphing to the schematic coordinate system. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to map the geographic coordinates of non-reference location to a triangular mesh for morphing to the schematic coordinate system. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, at an apparatus, a designation of one or more reference locations;
   creating, at the apparatus, at least one triangular mesh based, at least in part, on one or more geographic coordinates of the one or more reference locations on at least one geographic map, wherein the one or more geographic coordinates of the one or more reference locations represent one or more vertices of the triangular mesh;
   determining, at the apparatus, at least one triangle of the at least one triangular mesh containing one or more non-reference locations;
   determining, at the apparatus, one or more barycentric coordinates for the one or more non-reference locations based, at least in part, on the at least one triangle;
   caching, at the apparatus, the one or more barycentric coordinates, one or more geographic coordinates of the one or more non-reference locations on the at least one geographic map, or a combination thereof;
   mapping, at the apparatus, the one or more geographic coordinates of one or more non-reference locations to the at least one triangular mesh based, at least in part, on the caching;
   morphing, at the apparatus, the one or more geographic coordinates of the one or more non-reference locations according to at least one schematic coordinate system of at least one schematic map based, at least in part, on the mapping; and
   presenting, in real-time on a user interface of the apparatus, at least one schematic map including the one or more reference locations and the one or more non-reference locations thereon based on the morphing.

2. A method of claim 1, further comprising:
   initiating a normalization of the triangular mesh, the one or more geographic coordinates of the one or more reference locations, the one or more geographic coordinates of the non-reference locations, the at least one schematic coordinate system, or a combination thereof, wherein the mapping, the morphing, or a combination thereof of the one or more geographic coordinates of the one or more non-reference locations is based, at least in part, on the normalization.

3. A method of claim 2, wherein the normalization normalizes latitude information and longitude information to a scale between 0 and 1.

4. A method of claim 1, wherein the apparatus is a mobile device.

5. A method of claim 1, further comprising:
wherein the morphing of the one or more geographic coordinates of the one or more non-reference locations to the at least one schematic coordinate system is further based, at least in part, on the caching.

6. A method of claim 1, further comprising:
determining dimension information for one or more triangles of the at least one triangular mesh; and
determining whether to cause, at least in part, a subdivision or a combination of the one or more triangles based, at least in part, on the dimension information.

7. A method of claim 6, further comprising:
receiving a designation of one or more additional reference locations for creating the at least one schematic map, at least one geographic map that is represented by the at least one schematic map, or a combination thereof,
wherein the subdivision or the combination of the one or more triangles is based, at least in part, on the one or more additional reference locations.

8. A method of claim 1, further comprising:
determining scaling information for one or more representations of the one or more non-reference locations, the one or more reference locations, or a combination thereof based, at least in part, on an amount of distortion introduced by morphing the at least one geographic map to the at least one schematic map; and
presenting the one or more representations in the at least one schematic map on the user interface based, at least in part, on the scaling information.

9. A method of claim 1, wherein the at least one schematic map is a map of a transit system, and wherein the one or more reference locations include, at least in part, one or more stops, one or more lines, or a combination thereof of the transit system.

10. A method of claim 1, wherein the one or more non-reference locations include, at least in part, one or more points of interest, a user location, or a combination thereof.

11. An apparatus comprising:
at least one processor; and
at least one memory including computer program code for one or more programs,
the at least one memory and the computer program code configured to, with the at least one processor, cause the apparatus to perform at least the following,
receiving a designation of one or more reference locations;
create at least one triangular mesh based, at least in part, on one or more geographic coordinates of the one or more reference locations on at least one geographic map, wherein the one or more geographic coordinates of the one or more reference locations represent one or more vertices of the triangular mesh;
determine at least one triangle of the at least one triangular mesh containing one or more non-reference locations;
determine one or more barycentric coordinates for the one or more non-reference locations based, at least in part, on the at least one triangle;
cache, at the apparatus, the one or more barycentric coordinates, one or more geographic coordinates of the one or more non-reference locations on the at least one geographic map, or a combination thereof;
map the one or more geographic coordinates of one or more non-reference locations to the at least one triangular mesh based, at least in part, on the caching;
morph the one or more geographic coordinates of the one or more non-reference locations according to at least one schematic coordinate system of at least one schematic map based, at least in part, on the mapping; and
present, in real-time on a user interface of the apparatus, at least one schematic map including the one or more reference locations and the one or more non-reference locations thereon based on the morphing.

12. An apparatus of claim 11, wherein the apparatus is further caused to:
initiate a normalization of the triangular mesh, the one or more geographic coordinates of the one or more reference locations, the one or more geographic coordinates of the non-reference locations, the at least one schematic coordinate system, or a combination thereof,
wherein the mapping, the morphing, or a combination thereof of the one or more geographic coordinates of the one or more non-reference locations is based, at least in part, on the normalization.

13. An apparatus of claim 12, wherein the normalization normalizes latitude information and longitude information to a scale between 0 and 1.

14. An apparatus of claim 11, wherein the apparatus is a mobile device.

15. An apparatus of claim 14,
wherein the morphing of the one or more geographic coordinates of the one or more non-reference locations to the at least one schematic coordinate system is based, at least in part, on the caching.

16. An apparatus of claim 11, wherein the apparatus is further caused to:
determine dimension information for one or more triangles of the at least one triangular mesh; and
determine whether to cause, at least in part, a subdivision or a combination of the one or more triangles based, at least in part, on the dimension information.

17. An apparatus of claim 16, wherein the apparatus is further caused to:
receive a designation of one or more additional reference locations for creating the at least one schematic map, at least one geographic map that is represented by the at least one schematic map, or a combination thereof,
wherein the subdivision or the combination of the one or more triangles is based, at least in part, on the one or more additional reference locations.

18. A non-transitory computer-readable storage medium carrying one or more sequences of one or more instructions which, when executed by one or more processors, cause an apparatus to perform:
receiving a designation of one or more reference locations;

creating at least one triangular mesh based, at least in part, on one or more geographic coordinates of the one or more reference locations on at least one geographic map, wherein the one or more geographic coordinates of the one or more reference locations represent one or more vertices of the triangular mesh;

determining at least one triangle of the at least one triangular mesh containing one or more non-reference locations;

determining one or more barycentric coordinates for the one or more non-reference locations based, at least in part, on the at least one triangle;

caching, at the apparatus, the one or more barycentric coordinates, one or more geographic coordinates of the one or more non-reference locations on the at least one geographic map, or a combination thereof;

mapping the one or more geographic coordinates of one or more non-reference locations to the at least one triangular mesh based, at least in part, on the caching;

morphing the one or more geographic coordinates of the one or more non-reference locations according to at least one schematic coordinate system of at least one schematic map based, at least in part, on the mapping; and presenting, in real-time on a user interface of the apparatus, at least one schematic map including the one or more reference locations and the one or more non-reference locations thereon based on the morphing.

19. A non-transitory computer-readable storage medium of claim 18, wherein the apparatus is further caused to perform:

initiating a normalization of the triangular mesh, the one or more geographic coordinates of the one or more reference locations, the one or more geographic coordinates of the non-reference locations, the at least one schematic coordinate system, or a combination thereof, wherein the mapping, the morphing, or a combination thereof of the one or more geographic coordinates of the one or more non-reference locations is based, at least in part, on the normalization.

20. A non-transitory computer-readable storage medium of claim 18, wherein the apparatus is a mobile device.

* * * * *